US012710768B1

(12) United States Patent
Bhatia et al.

(10) Patent No.: US 12,710,768 B1
(45) Date of Patent: Aug. 18, 2026

(54) EDGE HARDWARE ONLINE MODEL LEARNING AND RANGE ESTIMATION FOR AUTONOMOUS AIMPOINT DETERMINATION

(71) Applicant: BAE SYSTEMS Information and Electronic Systems Integration Inc., Nashua, NH (US)

(72) Inventors: Amit Bhatia, Apex, NC (US); Peter Dusaitis, Manchester, NH (US); Jeffrey L. Jew, Brookline, NH (US); Tao Wang, Belmont, MA (US); Umang R. Patel, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 108 days.

(21) Appl. No.: 18/636,605

(22) Filed: Apr. 16, 2024

(51) Int. Cl.
*G05D 1/683* (2024.01)
*G05D 109/28* (2024.01)
(Continued)

(52) U.S. Cl.
CPC ............. *G05D 1/683* (2024.01); *G06V 10/26* (2022.01); *G06V 10/993* (2022.01); *G06V 20/56* (2022.01);
(Continued)

(58) Field of Classification Search
CPC ............... G05D 1/683; G05D 2109/28; G05D 2111/10; G06V 10/26; G06V 10/993; G06V 20/56; G06V 2201/07
See application file for complete search history.

(56) References Cited

U.S. PATENT DOCUMENTS 10,977,808 B2 * 4/2021 Newman ................. G06T 7/254
12,135,187 B1 * 11/2024 Crye ......................... F41F 3/04
(Continued)

FOREIGN PATENT DOCUMENTS

CN 117152201 A * 12/2023 ............. G06T 7/246

OTHER PUBLICATIONS

Machine Translation of CN-117152201-A (Year: 2023).*

*Primary Examiner* — Sahar Motazedi
(74) *Attorney, Agent, or Firm* — Maine Cernota & Curran; Gary McFaline

(57) ABSTRACT

A seeker configured to generate an aimpoint, wherein the seeker captures image frames associated with a forward-looking perspective of the platform that potentially contain a target and is configured to apply a first method of image processing to the image frames, the first method of image processing not requiring the use of a target model, to finalize a pixel area that matches characteristics associated with the target, to generate at least one track point corresponding to a distinctive portion of the target, and to generate an aimpoint associated with the target. While iteratively applying the first method, the seeker may also store the at least one image frame that matches characteristics associated with the target, creating a reference image frame containing the target; determine at least one track point on the target; search for and update the track points in a subsequent image frame; and search for new track points in the subsequent image frame, creating an updated target model. A second method of image processing may then be applied to subsequent image frames, the second method of image processing comprising using the target model to track the target and updating the aimpoint.

20 Claims, 5 Drawing Sheets

Identify distinctive image features in current and reference Image
400

Match features to obtain geometric transform
402

Map distinctive image features & aimpoint using transform
404

(51) Int. Cl.
*G05D 111/10* (2024.01)
*G06V 10/26* (2022.01)
*G06V 10/98* (2022.01)
*G06V 20/56* (2022.01)

(52) U.S. Cl.
CPC ...... *G05D 2109/28* (2024.01); *G05D 2111/10* (2024.01); *G06V 2201/07* (2022.01)

(56) References Cited

U.S. PATENT DOCUMENTS

| | | | | |
|---|---|---|---|---|
| 12,135,193 B1* | 11/2024 | Crye | .......................... | F41G 7/36 |
| 2020/0258242 A1* | 8/2020 | Liu | .......................... | G06T 7/70 |
| 2023/0009124 A1* | 1/2023 | Crye | .......................... | F41G 3/04 |
| 2024/0257501 A1* | 8/2024 | Yu | .......................... | G06V 10/761 |
| 2025/0054265 A1* | 2/2025 | Zhu | .......................... | G06T 3/40 |

* cited by examiner

EDGE HARDWARE ONLINE MODEL LEARNING AND RANGE ESTIMATION FOR AUTONOMOUS AIMPOINT DETERMINATION

STATEMENT OF GOVERNMENT INTEREST

The invention was made with United States Government support under Contract No. FA8651 20 C 0043 P00005, awarded by the U.S. Air Force Research Laboratory. The United States Government has certain rights in this invention.

FIELD OF THE DISCLOSURE

The following disclosure relates generally to targeting, and, more specifically, to autonomous aimpoint determination involving an initial search for a target without the use of a target model, the learning of a target model enroute to the target, and the use of passive range estimation techniques.

BACKGROUND

Seekers, which are sometimes referred to as trackers or target acquisition systems, are a part of guidance and targeting systems used to track a target. Such systems are most typically used to guide a platform, such as vehicle or projectile, such as a guided missile, to the target. Such systems also find use in the medical field, for example in tumor detection, in the automotive industry, where they are used for collision avoidance and autonomous driving, as well as in other fields.

To help the seeker identify the target, a model of the target is often used. That target model is typically trained using previously-defined models of a similar class to the target (e.g. a car, truck, aircraft, ship, aircraft carrier, etc.) or even a model of the target itself that is prepared beforehand. Seekers will typically look for, and sometimes track, distinctive features of a provided target model or models using optical or infrared image capture devices, such as cameras.

While these techniques for tracking allow for precise targeting of desirable aimpoints, i.e. a specific point on a target towards which a seeker guides a platform, knowing the target type and/or having a model of the target available in advance, which is required to employ these techniques, is not always possible. For instance, the storage space required for such target models, which may include multiple versions to account for different atmospheric or other conditions, such as fog, rain, and snow, renders their use impractical in many situations, and expensive even where practical. Furthermore, the processing power and memory required to compare those target models against image data in real-time or near real-time, as is often required, can be significant, often requiring multiple target models to be swapped into and out of memory as comparisons are made.

Another important consideration in the design of modern guidance and targeting systems is the determination of a suitable aimpoint on a target or other object of interest. While it is important to designate a vital part on the target as the aimpoint, since a near miss or a hit on a noncritical part may not achieve the desired outcome, seekers will typically lock onto and track the most easily recognized feature(s) or spot(s) on the target (the track point(s)), which may be an image centroid or a hotspot. While such features are relatively easy to track, they may not spatially coincide with desirable aimpoints on the object. The most desirable aimpoint(s) may also be obscured at times during the platform's approach to the target. The latter issue impedes the ability of the seeker to effectively track the aimpoint, while using a centroid position or average thereof as an aimpoint may result in a non-optimal hit on the target, even where the aimpoint is precisely targeted.

Additionally, in some cases the most desirable aimpoint on a target may be subject to classification. In those cases, personnel with the required clearances would be needed to upload data to the platform and the platform itself would need to be secured post-upload, raising costs and complexity associated with the platform's use.

Lastly, range estimation is often helpful, if not necessary, when attempting to track a target, since knowing the approximate range to a target can be used to determine the approximate size of a target, helping to discriminated between potential targets. Laser rangefinders and other sorts of range-estimation techniques, however, emit radiation that can be detected by the target, providing advance notice to the target that it is being targeted.

In light of the foregoing, there exists a need for a seeker that can precisely target a desirable aimpoint or aimpoints while minimizing the personnel who would be privy to such information and without the need to know the target type or have a model thereof in advance. Preferably, such a seeker would be able to use a track point corresponding to an easily tracked location, such as a hotspot in the case of an IR imager, that is distinct from the aimpoint while still guiding the platform to the aimpoint and to calculate range to the target and/or Pixel Spatial Resolution (PSR) without the use of an active range-finding system. Even more preferably, such a seeker would be able to be implemented using edge hardware, i.e. hardware at the edge of a network in close proximity to data needing to be processed, with limited storage, memory, and processing power.

SUMMARY

By developing a model of a target enroute thereto, using a previous frame or frame(s) of image data obtained from a perspective of a platform being guided to a target, with track points being identified and added on-the-fly and a most recent or best frame(s) of image data combined with identified track points serving as a target model at any given time, which is referred to herein as model learning and processing, while relying on alternative aimpoint determination techniques, such as model free processing, for initial tracking, and then using the target model created during model learning and processing for target tracking once the target is at a closer range, as will be described further herein, many of the aforementioned issues are resolved. These techniques are especially beneficial when used in conjunction with passive range estimation techniques and the use of a track point or track points offset from the aimpoint, also as taught herein.

One embodiment of the present disclosure provides a platform configured to intercept a target, the platform comprising: a guidance system comprising a seeker configured to generate an aimpoint corresponding to a specific location on the target; and a control system configured to receive the aimpoint from the guidance system and control the position of at least a portion of the platform, relative to the target, and to bring the at least a portion of the platform onto an intercept course with the target, wherein the seeker comprises: an image sensor configured to capture image data associated with a forward-looking perspective of the platform, the image data comprising image frames potentially containing the target; a processor in communication with the image sensor and with a non-transitory storage medium comprising instructions which, when executed by the processor, cause the processor to: receive image data associated with a forward-looking perspective of the platform being directed to the target, the image data comprising image frames potentially containing the target; apply a first method of image processing to the image data, the first method of image processing being one that does not require the use of a target model, to finalize a pixel area in at least one image frame that matches characteristics associated with the target, to generate at least one track point corresponding to a distinctive portion of the target, and to provide an aimpoint associated with the target to the control system; while iteratively applying the first method of image processing to the image data: storing the at least one image frame that matches characteristics associated with the target, creating a reference image frame containing the target; determining at least one track point on the target, the at least one track point comprising an invariant feature associated with the target; describing the at least one track point identified in the reference image frame using track point descriptors, wherein the reference image, at least one track point, and track point descriptors comprise a target model; searching for and updating the track points in a subsequent image frame; searching for new track points in the subsequent image frame; and describing the track points in the subsequent image frame using track point descriptors, creating an updated target model; applying a second method of image processing to the image data, the second method of image processing comprising using the target model to track the target and updating the aimpoint; and providing the updated aimpoint to the control system.

Another embodiment of the present disclosure provides such a platform, wherein the processor is further configured to determine a range to the target and/or size of the target using only image data, based on the rate of reduction of target size, using a linear regression problem and wherein the processor is further configured to model a target angle in pixels (α_pix) using range rate (ΔR), instantaneous field of view (IFOV), time to go (ttg), and cross-range projected dimension(s), as:

$$\propto_{pix} = \frac{\tan^{-1}\left(\frac{s}{ttg * \Delta R}\right)}{IFOV}$$

to use the model to solve for time to go, and then to combine the model with a range rate to determine the range to the target.

A further embodiment of the present disclosure provides such a platform, wherein the first image processing methods are selected from the group consisting of image segmentation, blob detection, corner detection, and Hough transforms.

Yet another embodiment of the present disclosure provides such a platform, wherein said image sensor is selected from the group consisting of infrared imagers, electro-optical imagers, radio telescopes, tomographic scanners, and optical imagers.

A yet further embodiment of the present disclosure provides such a platform, wherein a threshold quality value is applied to track points to control how strongly the seeker locks onto those track points and wherein the threshold value is recalculated per frame and is dependent on image quality.

Still another embodiment of the present disclosure provides such a platform, wherein the aimpoint comprises an offset from the at least one track point.

A still further embodiment of the present disclosure provides such a platform, wherein the offset is an equation comprising coefficients or values that can be set prior to execution and/or mutate after execution.

Even another embodiment of the present disclosure provides such a platform, wherein the processor is configured to switch from the first method of image processing to the second method of image processing upon the detection of clipping or upon a pixel spatial resolution falling below a predetermined value.

An even further embodiment of the present disclosure provides such a platform, wherein the processor is configured to compare target size and image frame size, to calculate when clipping is expected, and to transition from the first image processing method to the second image processing method before clipping is expected to occur, and wherein an image frame obtained prior to when clipping is expected to occur is used as the basis for the target model for all subsequent image processing.

A still even another embodiment of the present disclosure provides such a platform, wherein the processor is configured to receive information regarding current or anticipated directional changes and to prioritize searching for track points on a side of the image frame that is expected to remain visible longest, based on the direction of the turn.

A still even further embodiment of the present disclosure provides such a platform, wherein the first method of image processing comprises: using an image segmentation method, searching a first image frame for a single component blob within predetermined size limits corresponding to the target; and generating an estimated location for the target and searching for the single component blob within predetermined size limits corresponding to the target in a later image frame using the previously estimated location for the target, and updating the estimated location for the target.

Still yet another embodiment of the present disclosure provides such a platform, wherein, if multiple, single component blobs within predetermined size limits corresponding to the target are found in the current image frame, the single component blob closest to a cue is selected and used for generating an estimated location for the target.

One embodiment of the present disclosure provides a non-transitory computer readable medium storing instructions that, when executed by a processor, cause the processor to: receive image data associated with a forward-looking perspective of a platform being directed to a target, the image data comprising image frames potentially containing a target; apply a first method of image processing to the image data, the first method of image processing being one that does not require the use of a target model, to finalize a pixel area in at least one image frame that matches characteristics associated with the target, to generate at least one track point corresponding to a distinctive portion of the target, and to provide an aimpoint associated with the target to the control system; while iteratively applying the first method of image processing to the image data: storing at least one image frame that matches characteristics associated with the target, creating a reference image frame containing the target; determining at least one track point on the target, the at least one track point comprising an invariant feature associated with the target; describing the at least one track point identified in the reference image frame using track point descriptors, the reference image, at least one track point, and track point descriptors comprising a target model; searching for and updating the track points in a subsequent image frame; searching for new track points in the subsequent image frame; and describing the track points in the subsequent image frame using track point descriptors, creating an updated target model; and applying a second method of image processing to the image data, the second method of image processing comprising using the target model to track the target and update the aimpoint; and providing the updated aimpoint to the control system.

Another embodiment of the present disclosure provides such a computer readable medium, wherein the processor is further configured to estimate a range to the target and/or size of the target using only image data, based on the rate of reduction of target size using a linear regression problem and wherein the processor is further configured to model a target angle in pixels ($\alpha_{pix}$) using range rate ($\Delta R$), instantaneous field of view ($_I FOV$), time to go (ttg), and cross-range projected dimension(s), as:

$$\propto_{pix} = \frac{\tan^{-1}\left(\frac{s}{ttg * \Delta R}\right)}{IFOV}$$

to use the model to solve for time to go, and then to combine the model with a range rate to determine a range to the target.

A further embodiment of the present disclosure provides such a computer readable medium, wherein the processor is further configured to estimate a range to the target and/or size of the target using only image data, based on the rate of reduction of target size using a linear regression problem and wherein the processor is further configured to model a target angle in pixels ($\alpha_{pix}$) using range rate ($\Delta R$), instantaneous field of view ($_I FOV$), time to go (ttg), and cross-range projected dimension(s), as:

Yet another embodiment of the present disclosure provides such a computer readable medium, wherein the aimpoint is offset from the at least one track point.

A yet further embodiment of the present disclosure provides such a computer readable medium, wherein the offset comprises an equation comprising coefficients or values that can be set prior to execution of the instructions stored on the computer readable medium by the processor and/or mutate thereafter.

Still another embodiment of the present disclosure provides such a computer readable medium, wherein the processor is configured to switch from the first method of image processing to the second method of image processing upon the detection of clipping or upon a pixel spatial resolution falling below a threshold value.

A still further embodiment of the present disclosure provides such a computer readable medium, wherein the processor is configured to compare target size and image frame size, to calculate when clipping is expected, and to transition from the first image processing method to the second image processing method before clipping is expected to occur, and wherein an image frame obtained prior to when clipping is expected to occur is used as the basis for the target model for all subsequent image processing.

Even another embodiment of the present disclosure provides such a computer readable medium, wherein the processor is configured to receive information regarding current or anticipated directional changes of the platform and to prioritize searching for track points on a side of the image frame that is expected to remain visible longest, based on the direction of the current or anticipated directional change.

One embodiment of the present disclosure provides a seeker configured to seek a target, the seeker being configured to generate an aimpoint corresponding to a specific location on the target and comprising: an image sensor configured to capture image data associated with a forward-looking perspective of a platform being directed to the target, the image data comprising image frames potentially containing the target; and a processor in communication with the image sensor and with a non-transitory storage medium comprising instructions configured to cause the processor to: receive the image data; apply a first method of image processing to the image data, the first method of image processing being one that does not require the use of a target model, to finalize a pixel area in at least one image frame that matches characteristics associated with the target, to generate at least one track point corresponding to a distinctive portion of the target, and to generate an aimpoint associated with the target that would be usable by a control system; while iteratively applying the first method of image processing to the image data: storing at least one image frame, creating a reference image frame containing the target; determining at least one track point on the target, the at least one track point comprising an invariant feature associated with the target; describing the at least one track point identified in the reference image frame using track point descriptors, the reference image, at least one track point, and track point descriptors comprising a target model; searching for and updating the track points in a subsequent image frame; searching for new track points in the subsequent image frame; and describing the track points in the subsequent image frame using track point descriptors, creating an updated target model; applying a second method of image processing to the image data, the second method of image processing comprising using the target model to track the target and update the aimpoint; estimating a range to the target and/or size of the target using only image data, based on the rate of reduction of target size using a linear regression problem, wherein the processor is configured to model a target angle in pixels ($\alpha_{pix}$) using range rate ($\Delta R$), instantaneous field of view ($_I FOV$), time to go (ttg), and cross-range projected dimension(s), as:

$$\propto_{pix} = \frac{\tan^{-1}\left(\frac{s}{ttg * \Delta R}\right)}{IFOV}$$

to use the model to solve for time to go, and then to combine the model with a range rate to determine a range to the target.

Implementations of the techniques discussed above may include a method or process, a system or apparatus, a kit, or a computer software stored on a computer-accessible medium. The details or one or more implementations are set forth in the accompanying drawings and the description below. Other features will be apparent from the description, drawings and claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
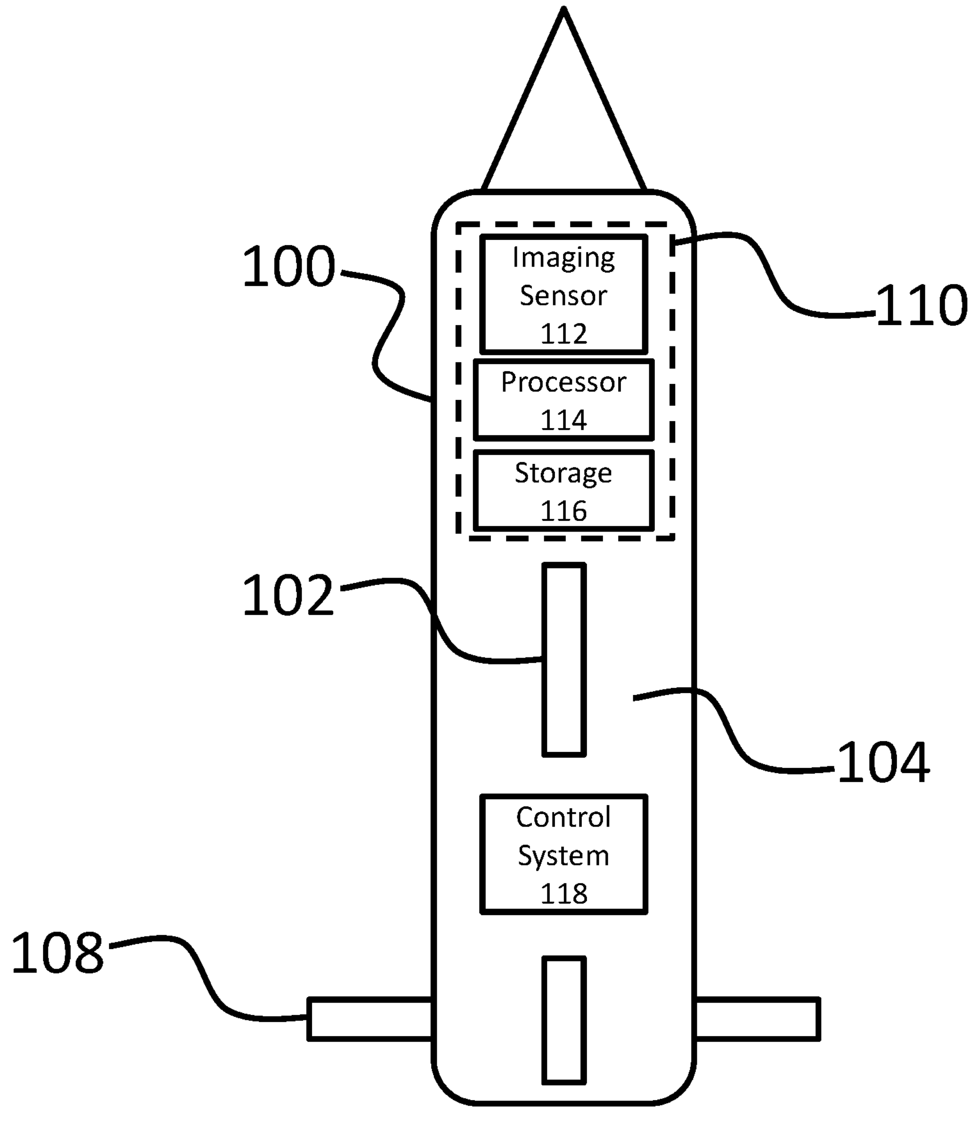
FIG. 1 is a schematic diagram showing a platform incorporating a seeker, in accordance with embodiments of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

As a preliminary matter, Pixel Spatial Resolution (PSR), as used herein, is a measure of how many units of distance a pixel of image data represents. PSR is intended to be construed as identical in meaning to the more common "Ground Spatial Distance" (GSD), but without implying that objects are ground-based.

Tracking a target using the model free processing 202, model learning and processing 204, and passive range estimation techniques and systems taught herein obviates the need to know a target type and/or have a target model 206 in advance. By learning a target model 206 enroute to the target after initially identifying and navigating towards the target using the model free processing 202 techniques taught herein, the need to swap target models 206 into and out of memory, to compare those target models 206 to images obtained by a seeker 110 in real-time or near real-time, and to store multiple target models 206 are obviated, allowing embodiments of the present disclosure to be implemented on hardware with limited storage, memory, and processing power, such as typical edge hardware.

In embodiments, the seeker is configured with basic decision-making capabilities, such as "if three objects are found, the left-most object is the target" to facilitate navigation in clutter situations.

Model free processing 202 refers to scanning an approximate target location for structures, such as blob-like structures or blobs, as used in blob analysis in computer vision and interframe tracking. In contrast, model learning and processing 204 refers to learning and updating a target model 206 enroute to the target, in embodiments while engaging in model free processing 202 to initially locate and track the target, before transitioning to using the target model 206 to track the target.

Now referring to the Figures, FIG. 1 depicts a platform 100 comprising an internal volume 104 holding a seeker 110 configured to track a target and direct the platform 100 to an aimpoint, which may be on or near the target. The seeker 110 may communicate with a control system 118 configured to control the platform 100 to accomplish this. The platform 100 may further comprise control surfaces 108 and/or wings 102 controlled by the control system 118 that can be used by the control system 118 to direct the platform 100 or at least a portion of the platform 100 to the target.

The seeker 110 comprises a suite of electronics and sensors, including non-transitory storage, such as memory, having software associated therewith. The suite of electronics may include an imaging sensor 112, such as a camera, which may be an infrared (IR), visible light, electro-optical (EO), tomographic, computerized tomographic (CT), or radio telescope camera, a staring array, also known as staring-plane array or focal-plane array, or similar. The imaging sensor 112 is configured to obtain imagery from a forward-facing perspective of the platform 100, aligned with the direction of travel, whether directly or indirectly, and may be in operative communication with a processor 114 that is itself in operative communication with storage 116, which, in embodiments, comprises a non-transitory storage medium having instructions (i.e., software) that carry out the methods described herein when executed by a processor.

Figure 5:
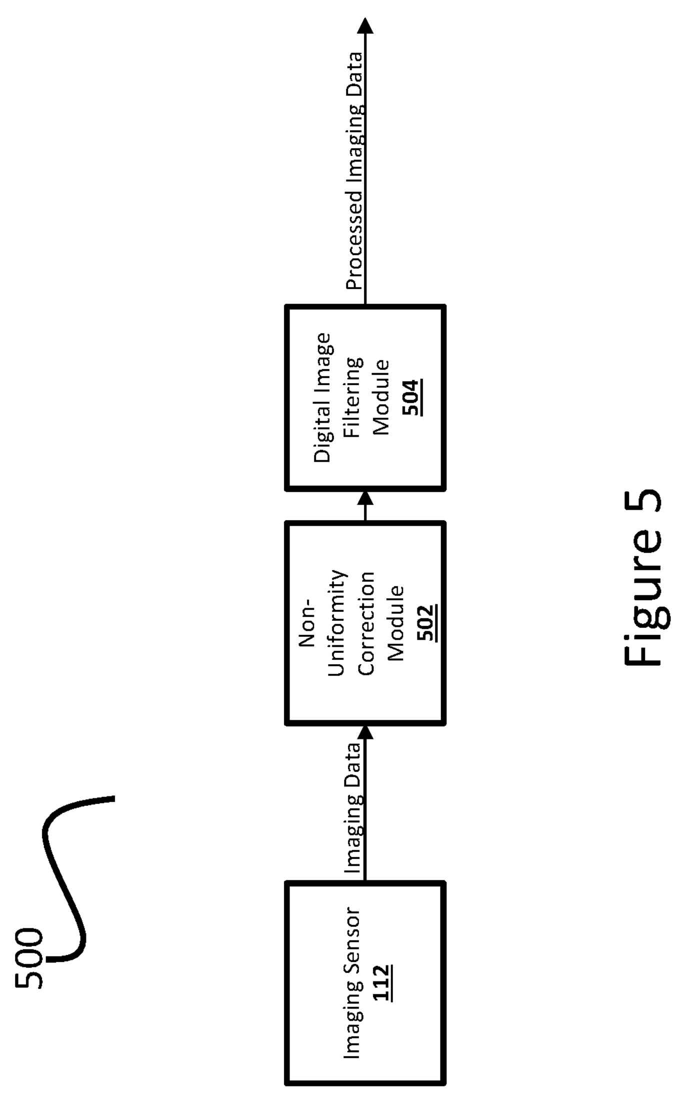
FIG. 5 is a schematic diagram describing an image processing pipeline, in accordance with embodiments of the present disclosure.

The imaging sensor 112 may be configured to send obtained imagery through an image processing pipeline 500, such as that depicted in FIG. 5, for processing enroute to the processor 114. Such an image processing pipeline 500 could, for instance, contain a non-uniformity correction (NUC) module 502 configured to correct non-uniformities in imaging data obtained by the imaging sensor 112 and/or a digital image filtering module 504 configured to filter the imaging data, these modules being instituted as hardware or software stored on, for example, storage 116. The processed imaging data may then be provided to the processor 114 for further processing.

In embodiments, imagery may be provided by a source external to the platform 100, such as from a launch vehicle used to launch the platform 100, either over a wired connection or wirelessly.

Figure 2:
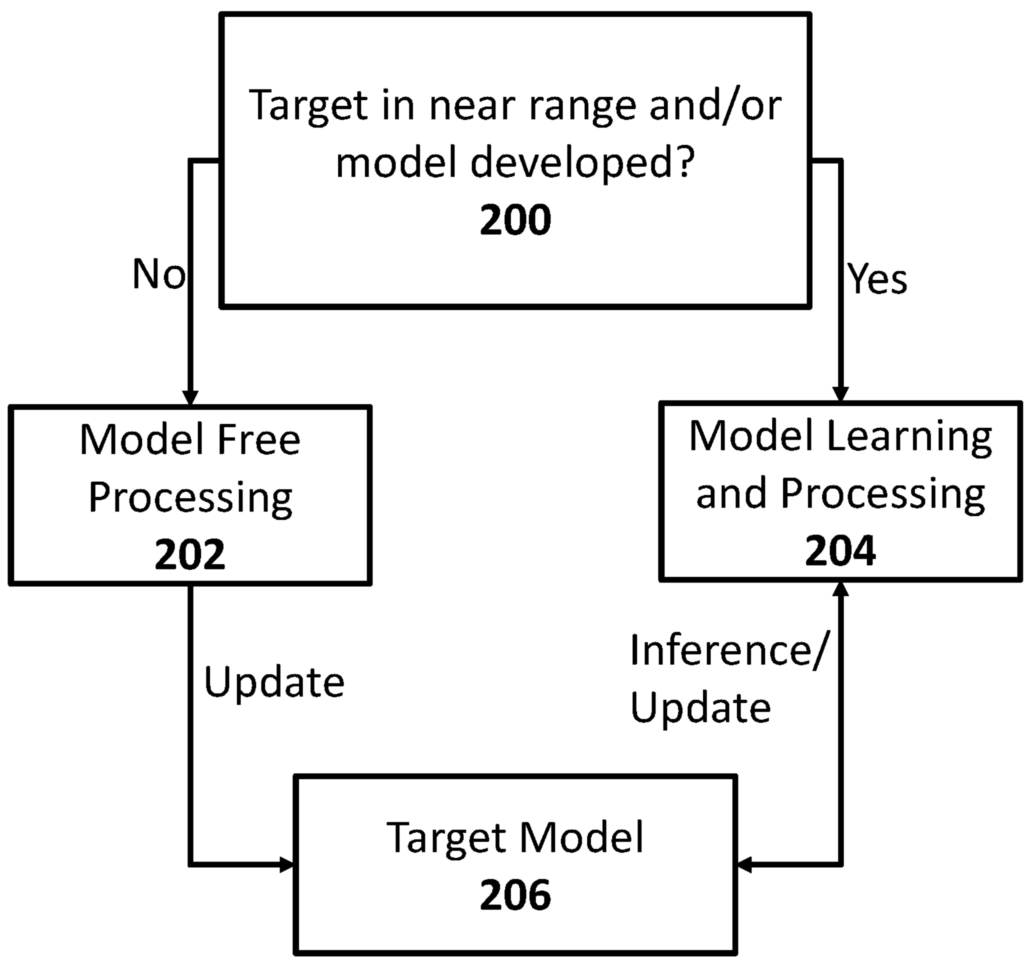
FIG. 2 is a flowchart describing a two-part method of target tracking, in accordance with embodiments of the present disclosure.

FIG. 2 illustrates two concepts, model free processing 202 and model learning and processing 204, that enable the seeker 110 to achieve successful aimpoint determination without requiring an initial target model 206, such as an intelligence-based target model 206. More specifically, a seeker 110 according to the teachings of the present disclosure may use a two-part method of target tracking where the seeker 110 does not require or utilize a target model 206 to initiate a search for a target (model free processing 202) before later transitioning to the use of a target model 206 developed during an initial approach (i.e. model learning and processing 204), i.e. when the target is not in near range, which is when the target is relatively far away and features are not yet discriminable, and/or a target model 206 has not been developed 200, such as when fewer than a predetermined number of track points have been identified. Instead of initially using a target model 206, embodiments use various image processing techniques during model free processing 202 that do not require a target model 206 to short-list and finalize a pixel area in imagery obtained by the imaging sensor 112 or otherwise provided to the seeker 110 that matches desired characteristics (e.g. size, contrast, etc.). These techniques include blob and corner detection, image segmentation, Hough transformations, and others, as described in more detail below, with reference to FIG. 3. Such image processing method(s) may then be used to select a readily identifiable portion of the target (e.g. a centroid or hotspot), which then becomes the "track point," for further tracking, with these initial determinations of the track point and tracking thereof being herein referred to as model free processing 202. Multiple track points may be used.

Track points should be understood to refer to distinctive, invariant (i.e. constant, unchanging, or slowly changing)

features of images, such as points, edges, blobs, and corners, that can be detected using feature detectors, such as Speeded-up Robust Features (SURF), Scale-Invariant Feature Transform (SIFT), and the like. Use of track points by the seeker 110 allows reliable matching between different views of a target and provides invariance with respect to scale changes, rotations, affine distortions, viewpoints, noise, and illumination.

Figure 4:
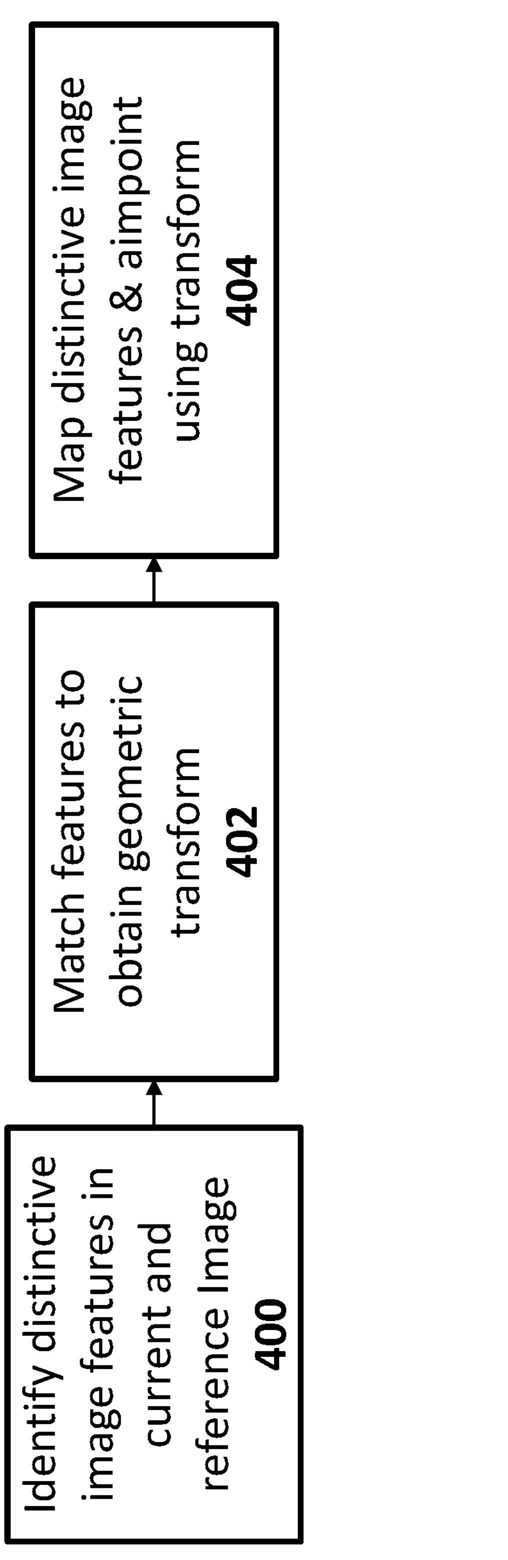
FIG. 4 is a flowchart describing model learning and processing, in accordance with embodiments of the present disclosure.

While model free processing 202 is taking place, model learning and processing 204 may also be concurrently engaged in. Model learning and processing 204, broadly speaking, comprises learning and updating the target model 206 during an approach to the target 206, while the seeker 110 relies on model free processing to guide the platform 100 to the target, as will be elaborated on herein, with reference to FIG. 4.

Once the target is relatively close and/or the target model 206 is developed, the seeker 110 may rely exclusively on model learning and processing 204 to guide the platform 100 to the target. Even after the switch to model learning and processing 204, the target model 206 may continue to be updated. Furthermore, model free processing 202 may be used even after a target model 206 has been developed and/or the target is not in near range 200 without departing from the scope of the present disclosure.

While the model free processing 202 approach could be employed until the platform 100 reaches the target, at a certain distance from the target, which is determined by the width of the aperture of the imaging sensor 112, where the imaging sensor 112 is a camera, the target inevitably becomes too large for the imaging sensor 112 to capture in a single frame. This phenomenon is herein referred to as clipping. Similar issues also arise where the target becomes partially obscured. Model learning and processing 204 becomes particularly useful in such cases (although applicable earlier as well) because this technique can use track points corresponding to the portion of the target that remains in frame, i.e. the unclipped portion of the target, to determine the aimpoint.

In embodiments, the detection of clipping in an image, i.e. when the target fills the entire image frame, is used to trigger a transition from model free processing 202 to model learning and processing 204.

In other embodiments, knowledge of target size and image frame size is used to calculate when to expect clipping to occur and the seeker 110 is configured to transition from model free processing 202 to model learning and processing 204 prior to clipping.

In still other embodiments, model learning and processing 204 commences after details of the target become distinguishable and knowledge of target size and image frame size is used to calculate when to expect clipping to occur. An image that is obtained prior to when this clipping is expected to occur is used as the target model 206 for all subsequent analysis, allowing all track points to be available for comparison the entire way to the target.

Figure 3:
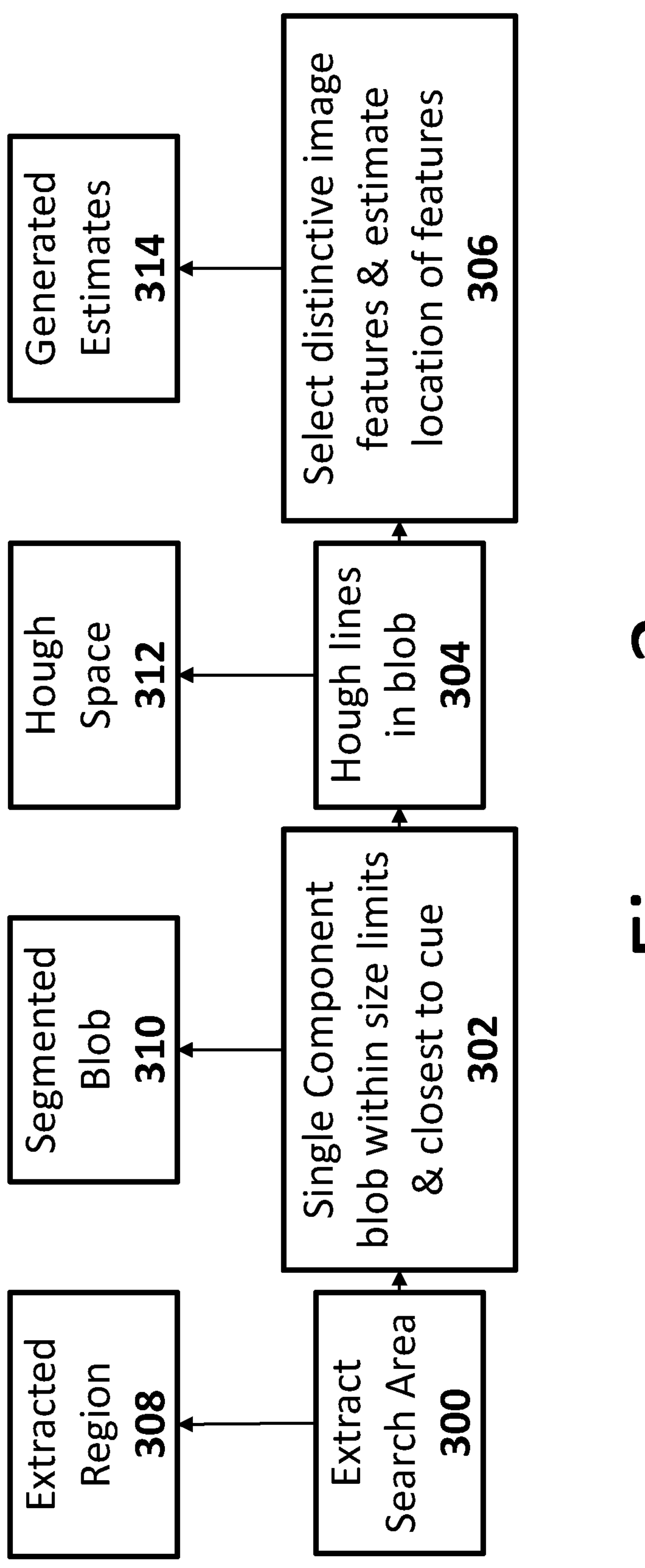
FIG. 3 is a flowchart describing model free processing, in accordance with embodiments of the present disclosure.

With reference to FIG. 3, embodiments of model free processing 202 comprise extracting a search area 300 from an image, forming an extracted region 308. The extracted region 308 may then be subjected to image processing techniques, such as blob detection and image segmentation, with the goal being to find a single component blob within certain, predefined size limits that is the closest blob to a provided cue 302. Image segmentation techniques can then be employed to create a segmented blob 310.

Following creation of the segmented blob 310, a transform, such as a Hough Transform, can be used to recognize complex lines, such as Hough lines, and other shapes, such as circles and quadrilaterals of specific types, in the segmented blob 310. These features are then used to map edge points onto a coordinate system 304. In embodiments, the coordinate system is the Hough Space 312, a 2D plane that has a horizontal axis representing the slope and the vertical axis representing the intercept of a line on an edge image.

Once lines are detected, further detection techniques and/or algorithms are used to select distinctive image features, such as a waterline, in the case where a target is a ship, or an edge, and to estimate the location of those distinctive image features 306, relative to the platform 100; the resulting generated estimates 314 may be used by the seeker 110 to guide the platform 100 to the target. The distinctive image features are then tracked enroute to the target and may be herein referred to as track point(s). The precise detection techniques and/or algorithms used would depend on the image feature(s) being detected, with suitable detection techniques and/or algorithms being known to those of ordinary skill in the art.

In embodiments, image processing methods used on the extracted region 308 to short-list and finalize the pixel area in the imagery that matches desired characteristics (e.g. size, contrast etc.) and to generate an estimate of the track point include image segmentation, corner detection, Hough transform, and others.

In embodiments, a variation on the tip and cue process, which has been primarily employed by imaging satellites, is used during model free processing 202. A typical tip and cue process uses satellite monitoring to identify and track large objects. The process begins with a low-resolution satellite sensor that scans a wide area, such as the ocean. After a ‘tip’ noting a possible location of a target has been generated, the data is relayed to a team or system that will ‘cue,’ or send the information to a high-resolution sensor to get a better look at the object in question.

In embodiments of the present disclosure, the seeker 110 acquires an image over an area of interest (AOI), for instance an area thought to contain a target, such as a vessel. The seeker may then provide a ‘tip’ comprising location, time, velocity, and trajectory information concerning a likely target, for example, to itself to ‘cue’ further observation at a later time at a location expected based on the information provided in the tip. In this example, the ‘cue’ is monitoring the same object at a different time, using the information in the ‘tip’ to determine where to initially look.

In embodiments, the ‘tip’ is provided by an external source, such as a satellite.

In embodiments, the generated estimates 314 are used as tips for future cues, for instance, tips for a subsequent frame may be generated using the generated estimates 314 by providing information about the known trajectory of the target and deviations therefrom, allowing for a smooth estimation of an approximate, potential future location of the target.

Notably, these approaches do not require any a-priori knowledge of target type or a model thereof.

A second aspect of the two-part method of target tracking taught herein is the development of a target model 206 as features of the target become discriminable, concurrently with model free processing 202. This second aspect is herein referred to as model learning and processing 204 and is further described herein with reference to FIG. 4.

In embodiments, model learning and processing 204 is accomplished by identifying distinctive, invariant features in a current image, which serves as a target model 206, as well as a subsequent image, which is herein referred to as a reference image 400. These invariant features serve as track points and, once matched, are used to obtain a geometric transform 402, which can then be used to align the images to one another and map any remaining track points as well as an aimpoint to the current image 404, which can then serve as the target model 206 in a subsequent iteration of the process. The target model 206 may continue to be refined during model learning and processing 204.

Embodiments may utilize a track point or track points corresponding to an easily tracked location or locations, such as a hotspot in the case of an optical seeker, that is separate and offset from a desired aimpoint during model learning and processing 204 and/or model free processing 202. In addition to providing easier and more stable tracking, this allows targeting of an aimpoint that is above, below, in front of, or behind the target as well as obscured portions of the target, such as a portion of a vessel that is obscured by an ocean swell or that is beyond the horizon, for example.

More specifically, the offset to any desired aimpoint on the target can be determined by using the track point(s) and a target pose estimate, which may be obtained in known ways, in embodiments using a mean angle of lines detected during model free processing 202, allowing targeting even of obscured aimpoints or aimpoints adjacent the target.

In embodiments, the offset may be modified by a coefficient. Allowing an offset to be entered into the seeker 110 that obscures the aimpoint, given knowledge of the track point(s), allows only the coefficients themselves to be subject to classification in cases where the precise aimpoint is itself subject to classification. Additionally, those coefficients may be uploaded to the seeker 110 just before launch, such as on a flight line, further limiting security issues.

In embodiments, once sufficient track points are obtained, additional potential track points may be disregarded or may be used to replace less distinctive track points.

In embodiments, track points are described using track point descriptors. Track point descriptors provide context that further describes track points and allows track points to be compared across images. They summarize, in vector format (of constant length) various characteristics about the track points; for example, the intensity of a track point in the direction of its most pronounced orientation. Track point descriptors are generally independent of track point position, robust against image transformations, and scale independent. For example, track point descriptors may use local image gradients at a selected scale and rotation to describe each track point region. Track point descriptors provide a unique and robust description of an image feature, for example by describing the intensity distribution of the pixels within the neighborhood of a point of interest. In embodiments, track point descriptors from multiple image frames are used in an ensemble manner, i.e. combining predictions from multiple target models 206 to obtain better predictive performance, such as by determining the presence of an outlier in data and removing the outlier.

In embodiments, the use of track point descriptors comprises using local image gradients at a selected scale and rotation to describe track point regions, and then searching for those track point regions in subsequent frames.

In embodiments, characteristics and distinctive features of a target are described using track point descriptors, such as SURF track point descriptors, and the seeker 110 is configured to utilize those track point descriptors to identify the target.

In embodiments, intelligence concerning the location of the target relative to other objects in the nearby environment is used to create track point descriptors that are loaded to the seeker 110 prior to target acquisition, although alternate methods would be apparent to those of ordinary skill in the art.

In embodiments, a threshold quality value, which may be based on a ratio of target space to pixel space resolution and may take into account the sharpness of image features, is applied to the track point descriptors, such that the quality required by the seeker 110 to lock to distinctive features can be adjusted. Using a fixed threshold quality value, however, can result in an insufficient number of track points for matching being obtained if the image quality is degraded, due to fog, rain, or snow, for example. Use of a threshold that is dynamically adjusted based on overall image quality enables a sufficient number of track points to be obtained while ensuring that those track points are of the highest possible quality given environmental conditions. Additionally, use of a threshold quality value as described herein does not require multiple models to take into account various environmental conditions that may affect the appearance of distinctive features thereof, allowing model learning and processing to be employed on relatively low SWaP-C hardware, such as typical edge hardware.

In embodiments, an initial target model 206 is created during model free processing 202.

In embodiments, the target model 206 comprises a best image, whether measured by quality, number of keypoints, or other factors, or combination of images in a sequence.

In embodiments, model learning and processing 204 comprises the use of evolutionary learning techniques, i.e. techniques that solve optimization problems in a stochastic manner, such as unsupervised evolutionary learning, to learn the target model 206.

Furthermore, it is desirable to keep the target near the middle of near the center of the Field of View (FOV) of the imaging sensor 112, since the target will naturally expand out towards the edge of the FOV/image frame and fall off (i.e. become clipped) as the platform 100 approaches the target. Where the platform 100 changes direction, however, elements will move across the image sensor's FOV. In such situations, it is more desirable to select track points near those edges that will remain within the image sensor's FOV longer. Therefore, the seeker 110 may be configured to receive information regarding current or anticipated directional changes, such as from the control system 118, and to prioritize searching for track point descriptors on a side of the image frame that is expected to remain in the image sensor's FOV longest, based on the direction of the anticipated turn.

Additionally, the distance between the target and the platform 100 is critical to calculating Pixel Spatial Resolution (PSR), a measure of how many units of distance a pixel of image data represents, which is itself critical to the seeker's 110 determination of an aimpoint. More specifically, using the calculated PSR, a seeker 110 can determine a specific distance from a track point, which is required in embodiments that utilize an offset from a track point to determine the aimpoint. The calculated PSR can also be used to infer the size of the target, allowing the seeker 110 to discriminate between multiple potential targets.

To avoid issues associated with active devices, which may alert the target to the platform 100, embodiments utilize passive range estimation techniques based solely on image data, as will be taught herein, thereby avoiding providing advance notice to a target, due to the lack of detectable emissions. For example, embodiments are configured to capture the relationship between image regions across multiple frames using a linear regression model to generate an estimate of the range to the target. By calculating PSR based on the rate of reduction of target size, the issue of early detection is resolved.

In embodiments, the linear regression model captures the relationship between image regions across multiple frames and the model solution provides an estimate of the range to the target. Specifically, using the location of track points on the target (e.g. front and back corners) as the image region and corresponding timestamp information, a linear regression model is used to capture this relationship. For range rate (ΔR—the rate at which range (distance) is changing with time (seconds)), instantaneous field of view ($_I$FOV—the angle subtended by a single pixel), time to go (ttg), and cross-range projected dimension(s), the target angle in pixels ($\alpha_{pix}$) can be modeled as:

$$\propto_{pix} = \frac{\tan^{-1}\left(\frac{s}{ttg*\Delta R}\right)}{IFOV} \quad \text{Equation 1: Target Angle Calculation Model}$$

Using this model to solve for time to go and then multiplying by range rate provides a target range estimate with an error that trends towards zero as distance is reduced.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A platform configured to intercept a target, the platform comprising:

a guidance system comprising a seeker configured to generate an aimpoint corresponding to a specific location on the target; and a control system configured to receive the aimpoint from the guidance system and control a position of at least a portion of the platform, relative to the target, and to bring the at least a portion of the platform onto an intercept course with the target, wherein the seeker comprises:

an image sensor configured to capture image data associated with a forward-looking perspective of the platform, the image data comprising image frames potentially containing the target; and a processor in communication with the image sensor and with a non-transitory storage medium comprising instructions which, when executed by the processor, cause the processor to:

receive the image data associated with the forward-looking perspective of the platform being directed to the target, the image data comprising the image frames potentially containing the target;

apply a first method of image processing to the image data, the first method of image processing being one that does not require the use of a target model, to finalize a pixel area in at least one image frame that matches characteristics associated with the target, to generate at least one track point corresponding to a distinctive portion of the target, and to provide the aimpoint associated with the target to the control system;

while iteratively applying the first method of image processing to the image data:

store the at least one image frame that matches characteristics associated with the target thereby creating a reference image frame containing the target;

determine the at least one track point on the target, the at least one track point comprising an invariant feature associated with the target;

describe the at least one track point identified in the reference image frame using track point descriptors, wherein the reference image frame, the at least one track point, and the track point descriptors comprise the target model;

search for and update the at least on track point in a subsequent image frame;

search for new track points in the subsequent image frame; and describe the new track points in the subsequent image frame using the track point descriptors and create an updated target model using the new track points;

apply a second method of image processing to the image data, the second method of image processing comprising using the updated target model to track the target and updating the aimpoint; and provide the updated aimpoint to the control system.

2. The platform according to claim 1, wherein the processor is further configured to determine a range to the target and/or size of the target using only the image data, wherein said determination of the range to target and/or the size of target is based on a rate of reduction of target size using a linear regression problem and wherein the processor is further configured to model a target angle in pixels ($\alpha_{pix}$) using range rate (ΔR), instantaneous field of view ($_I$FOV), time to go (ttg), and cross-range projected dimension(s), as:

$$\propto_{pix} = \frac{\tan^{-1}\left(\frac{s}{ttg*\Delta R}\right)}{IFOV}$$

to use the model to solve for time to go, and then to combine the model with a range rate to determine the range to the target.

3. The platform according to claim 1, wherein the first method of image processing is selected from the group consisting of image segmentation, blob detection, corner detection, and Hough transforms.

4. The platform according to claim 1, wherein the image sensor is selected from the group consisting of infrared imagers, electro-optical imagers, radio telescopes, tomographic scanners, and optical imagers.

5. The platform according to claim 1, wherein a threshold quality value is applied to track points and used to determine if the seeker will lock onto those track points satisfying the threshold quality value and wherein the threshold value is recalculated per frame and is dependent on image quality.

6. The platform according to claim 1, wherein the aimpoint comprises an offset from the at least one track point.

7. The platform according to claim 6, wherein the offset is an equation comprising coefficients or values that can be set prior to execution of the instructions by the processor and/or mutate thereafter.

8. The platform according to claim 1, wherein the processor is configured to switch from the first method of image processing to the second method of image processing upon a detection of clipping or upon a pixel spatial resolution falling below a predetermined value.

9. The platform according to claim 1, wherein the processor is configured to compare target size and image frame size, to calculate when clipping is expected, and to transition from the first image processing method to the second image processing method before clipping is expected to occur, and wherein an image frame obtained prior to when clipping is expected to occur is used as the basis for the target model for all subsequent image processing.

10. The platform according to claim 1, wherein the processor is configured to receive information regarding current or anticipated directional changes and to prioritize searching for track points on a side of an image frame that is expected to remain visible longest, based on a direction of a turn.

11. The platform according to claim 1, wherein the first method of image processing comprises:

using an image segmentation method, searching a first image frame for a single component blob within predetermined size limits corresponding to the target; and generating an estimated location for the target and searching for the single component blob within predetermined size limits corresponding to the target in a later image frame using the previously estimated location for the target, and updating the estimated location for the target.

12. The platform of claim 11, wherein, if multiple, single component blobs within predetermined size limits corresponding to the target are found in the current image frame, the single component blob closest to a cue is selected and used for generating the estimated location for the target.

13. A non-transitory computer readable medium comprising instructions that, when executed by a processor, cause the processor to:

receive image data associated with a forward-looking perspective of a platform being directed to a target, the image data comprising image frames potentially containing the target;

apply a first method of image processing to the image data, the first method of image processing being one that does not require the use of a target model, to finalize a pixel area in at least one image frame that matches characteristics associated with the target, to generate at least one track point corresponding to a distinctive portion of the target, and to provide an aimpoint associated with the target to a control system configured to control a position of at least a portion of the platform, relative to the target, and to bring the at least a portion of the platform onto an intercept course with the target;

while iteratively applying the first method of image processing to the image data:

store the at least one image frame that matches characteristics associated with the target thereby creating a reference image frame containing the target;

determine the at least one track point on the target, the at least one track point comprising an invariant feature associated with the target;

describe the at least one track point identified in the reference image frame using track point descriptors, the reference image frame, the at least one track point, and the track point descriptors comprising the target model;

search for and update the at least one track point in a subsequent image frame;

search for new track points in the subsequent image frame; and describe the new track points in the subsequent image frame using the track point descriptors and create an updated target model using the new track points;

apply a second method of image processing to the image data, the second method of image processing comprising using the updated target model to track the target and update the aimpoint; and provide the updated aimpoint to the control system.

14. The computer readable medium according to claim 13, wherein the processor is further configured to estimate a range to the target and/or size of the target using only the image data, wherein said determination of the range to target and/or the size of target is based on a rate of reduction of target size using a linear regression problem and wherein the processor is further configured to model a target angle in pixels ($\alpha_{pix}$) using range rate ($\Delta R$), instantaneous field of view ($_I FOV$), time to go (ttg), and cross-range projected dimension(s), as:

$$\propto_{pix} = \frac{\tan^{-1}\left(\frac{s}{ttg * \Delta R}\right)}{IFOV}$$

to use the model to solve for time to go, and then to combine the model with a range rate to determine the range to the target.

15. The computer readable medium according to claim 13, wherein the aimpoint is offset from the at least one track point.

16. The computer readable medium according to claim 15, wherein the offset comprises an equation comprising coefficients or values that can be set prior to execution of the instructions stored on the computer readable medium by the processor and/or mutate thereafter.

17. The computer readable medium according to claim 13, wherein the processor is configured to switch from the first method of image processing to the second method of image processing upon a detection of clipping or upon a pixel spatial resolution falling below a threshold value.

18. The computer readable medium according to claim 13, wherein the processor is configured to compare target size and image frame size, to calculate when clipping is expected, and to transition from the first image processing method to the second image processing method before clipping is expected to occur, and wherein an image frame obtained prior to when clipping is expected to occur is used as the basis for the target model for all subsequent image processing.

19. The computer readable medium according to claim 13, wherein the processor is configured to receive information regarding current or anticipated directional changes of the platform and to prioritize searching for track points on a side of an image frame that is expected to remain visible longest, based on the current or anticipated directional changes.

20. A seeker configured to seek a target, the seeker being configured to generate an aimpoint corresponding to a specific location on the target and comprising:

an image sensor configured to capture image data associated with a forward-looking perspective of a platform being directed to the target, the image data comprising image frames potentially containing the target; and a processor in communication with the image sensor and with a non-transitory storage medium comprising instructions configured to cause the processor to:

receive the image data;

apply a first method of image processing to the image data, the first method of image processing being one that does not require the use of a target model, to finalize a pixel area in at least one image frame that matches characteristics associated with the target, to generate at least one track point corresponding to a distinctive portion of the target, and to generate the aimpoint associated with the target and provide the aimpoint to a control system configured to control a position of at least a portion of the platform, relative to the target, and to bring the at least a portion of the platform onto an intercept course with the target;

while iteratively applying the first method of image processing to the image data:

store the at least one image frame thereby creating a reference image frame containing the target;

determine the at least one track point on the target, the at least one track point comprising an invariant feature associated with the target;

describe the at least one track point identified in the reference image frame using track point descriptors, the reference image frame, the at least one track point, and the track point descriptors comprising the target model;

search for and update the at least one track point in a subsequent image frame;

search for new track points in the subsequent image frame; and describe the new track points in the subsequent image frame using the track point descriptors and create an updated target model using the new track points;

apply a second method of image processing to the image data, the second method of image processing comprising using the target model to track the target and update the aimpoint; and estimate a range to the target and/or size of the target using only the image data, wherein said determination of the range to target and/or the size of target is based on a rate of reduction of target size using a linear regression problem, wherein the processor is configured to model a target angle in pixels ($\alpha_{pix}$) using range rate ($\Delta R$), instantaneous field of view ($I_{FOV}$), time to go (ttg), and cross-range projected dimension(s), as:

$$\propto_{pix} = \frac{\tan^{-1}\left(\frac{s}{ttg * \Delta R}\right)}{IFOV}$$

to use the model to solve for time to go, and then to combine the model with a range rate to determine the range to the target.

* * * * *